United States Patent [19]

Eblen et al.

[11] Patent Number: 4,653,455
[45] Date of Patent: Mar. 31, 1987

[54] ELECTRICALLY CONTROLLED FUEL INJECTION PUMP FOR INTERNAL COMBUSTION ENGINES

[75] Inventors: Ewald Eblen, Stuttgart; Karl Hofmann, Remseck; Volker Holzgrefe, Ditzingen; Jean Pigeroulet, Villeurbanne; Néstor Rodríguez-Amaya, Stuttgart; Nikolaus Simon, Gerlingen; Dietrich Trachte, Campinas; Friedrich Weiss, Korntal-Münchingen; Ewald Ziegler, Heimsheim, all of Fed. Rep. of Germany

[73] Assignee: Robert Bosch GmbH, Stuttgart, Fed. Rep. of Germany

[21] Appl. No.: 775,872

[22] Filed: Sep. 13, 1985

[30] Foreign Application Priority Data

Sep. 14, 1984 [DE] Fed. Rep. of Germany ....... 3433711
Jun. 14, 1985 [DE] Fed. Rep. of Germany ....... 3521425
Jul. 2, 1985 [DE] Fed. Rep. of Germany ....... 3523536

[51] Int. Cl.$^4$ ............................................. F02M 39/00
[52] U.S. Cl. ..................................... 123/506; 123/458; 123/503; 239/88
[58] Field of Search ............... 123/506, 503, 458, 500, 123/446, 479, 501; 239/88–95, 533.2–533.12, 585

[56] References Cited

U.S. PATENT DOCUMENTS

| | | | |
|---|---|---|---|
| 1,664,608 | 4/1928 | French | 123/506 |
| 4,129,253 | 12/1978 | Bader, Jr. et al. | 239/88 |
| 4,129,256 | 12/1978 | Bader et al. | 123/506 |
| 4,385,614 | 5/1983 | Eheim | 123/506 |
| 4,392,612 | 7/1983 | Deckard et al. | 239/88 |
| 4,491,111 | 1/1985 | Eheim | 123/506 |
| 4,497,298 | 2/1985 | Ament | 123/506 |
| 4,530,337 | 7/1985 | Laufer | 123/506 |
| 4,583,509 | 4/1986 | Schechter | 123/458 |
| 4,586,480 | 5/1986 | Kobayashi | 123/458 |
| 4,603,671 | 8/1986 | Yoshinaga | 123/458 |

FOREIGN PATENT DOCUMENTS 0180733 10/1983 Japan ................................. 123/458

Primary Examiner—Carl Stuart Miller
Attorney, Agent, or Firm—Edwin E. Greigg

[57] ABSTRACT

The injection pump has a pump piston driven with a constant stroke which pumps fuel at injection pressure to an injection nozzle so long as an electrically actuated overflow valve blocks the flow of the fuel overflowing via an overflow conduit to a low-pressure chamber. The overflow valve is a needle valve, the valve needle of which, opening inward toward a pressure chamber that can be placed under injection pressure, by means of a conical closing surface radially defining a needle tip controls a valve seat that widens conically toward the pressure chamber. The cone angle of the closing surface is larger than the cone angle of the associated valve seat and the closing surface forms a sealing edge, the diameter of which is equal to or only slightly smaller than the guide diameter of the guide shank on the valve member. In a preferred embodiment, the needle tip of the valve member has an external contour on its end, adjacent to the closing surface, which directs the fuel flow and reinforces the opening movement. The injection pump is particularly suitable for high-pressure injection in Diesel engines, in order to attain an exact electrical control of the supply onset and supply quantity, if a reservoir chamber defined by a deflecting piston is connected to a high-pressure chamber that includes the pump work chamber.

21 Claims, 9 Drawing Figures

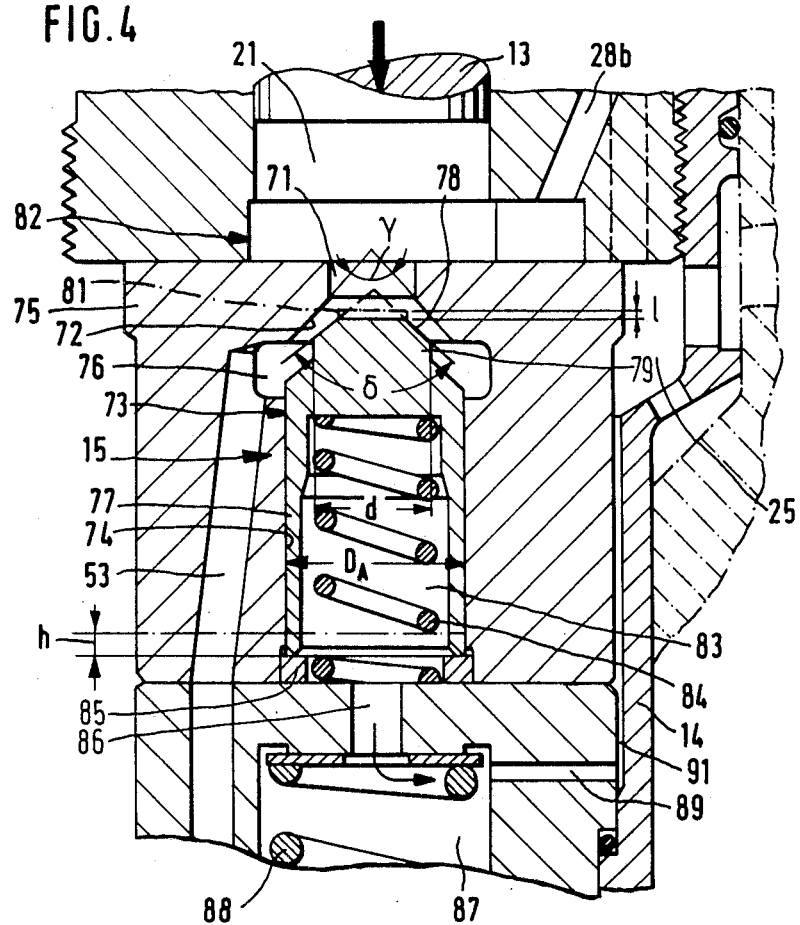

ELECTRICALLY CONTROLLED FUEL INJECTION PUMP FOR INTERNAL COMBUSTION ENGINES

BACKGROUND OF THE INVENTION

The invention relates to an electrically controlled fuel injection pump for internal combustion engines as generically defined hereinafter. In such a pump, known from U.S. Pat. No. 4,392,612, which as a unit fuel injector is built directly into the cylinder head of the associated engine and in which both the mechanically driven fuel injection pump and the associated injection nozzle are accommodated in a common housing, the fuel injection quantity that is positively displaced from the pump work chamber to the injection nozzle during the supply stroke of the pump piston is determined by the ON time of an electromagnetically actuated overflow valve that is open when it is free of electric current. This overflow valve is inserted into an overflow conduit joining the pump work chamber and a low-pressure chamber and is embodied as a slide valve that opens outward. In the closed state, it is balanced in pressure, because the fuel that has been put under injection pressure in the pump work chamber acts upon a pressure chamber formed by an annular groove on the valve needle shank and defined toward the outside by the guide bore, so that no axial forces can be exerted. If this valve is switched over into its open position, however, with the adjusting magnet not in the excited state and with the aid of a compression spring biased in the opening direction, then the expanding fuel in the low-pressure chamber shoots through the narrow gap between the conical valve seat and the corresponding conical closing surface, the latter widening toward the outside, at the remote end section of the valve needle in terms of the adjusting member. In this process, additional hydraulic forces are exerted; they reinforce the opening movement but, disadvantageously, because of the restriction in the flow, they also generate counter forces and lead to what is known as valve buzzing. This effect is due to a slight fluttering movement of the valve member, and while it is desirable in injection valves, it is disadvantageous in control valves.

Fuel injection pumps of a similar type are also known, which instead of an outwardly opening overflow valve have an inwardly opening magnetic valve to control the onset and end of fuel supply (U.S. Pat. Nos. 1,664,608 and 4,129,253). In these valves, the electromagnet which acts as the electrical control member must firmly hold the valve member in the closing position, counter to the injection pressure which is exerted centrally on the valve needle tip. This valve cannot be realized such that it is pressure-balanced, and at high injection pressures the adjusting magnet is capable of keeping the valve in its closing position only if the seat diameter is selected to be very small. This is attained, in the known fuel injection pumps, by means of a preceding throttle bore disposed between the pump work chamber and the valve seat. This provision has the disadvantage, however, that the outflow speed, as well, of the fuel flowing out of the pump work chamber at the end of injection is throttled, which is a hindrance to achieving the sharply-defined, rapid end of injection that is desired.

From German Offenlegungsschrift No. 31 39 669, a fast-switching magnetic valve is also known, which can also be used for controlling injection and which generates a very large closing force by means of two axial air gaps axially offset from one another. This valve, too, has the disadvantage of the valve embodiment used in the other pumps discussed above, namely that in the closed state, because of the injection pressure being exerted upon the valve seat surface, it is not pressure-balanced and can thus be used only up to a limited pressure level, for instance for controlling a gasoline injection pump.

OBJECT AND SUMMARY OF THE INVENTION

It is accordingly the principal object of the present invention to equip fuel injection pumps of the above-described type with a fast-switching overflow valve, intended for controlling the onset and end of supply in an accurately timed manner, which does not have the above-discussed disadvantages.

In the fuel injection pump according to the invention and wherein the overflow valve is designed as an inwardly opening needle valve, the opening movement of the valve member embodied as a valve needle is reinforced by the hydraulic forces engaging the needle tip, and the valve member is retained in the opening position without its tending to fluttering; also, to avoid unintended hydraulic forces which act in the opening direction when the valve is closed, the cone angle of the conical closing surface at the tip of the valve needle is greater than the cone angle of the associated valve seat, which widens conically toward the pressure chamber. As a result, the closing surface and the adjoining cylindrical jacket face at the end section of the valve member form a precisely defined sealing edge, the diameter of which, with complete pressure equalization, is equal to the guide diameter of the guide shank on the valve needle, or else slightly smaller than the guide diameter in the case where only a partial pressure equalization is desired. A precisely graduated, extremely fine pressure step on the valve needle shank can replace an otherwise required compression spring acting in the opening direction, or else it can reinforce such a compression spring in order to accelerate the valve needle opening movement.

By means of the characteristics recited herein, advantageous further embodiments and refinements of the fuel injection pump disclosed are attainable. For instance, by providing the needle tip with a rotationally symmetrical extension and with a streamlined external contour, the above-mentioned accelerated opening movement can be very effectively reinforced with very simple means. In an advantageous embodiment of the invention, an additional hydraulic force, which reinforces the opening movement, is attained as early as the beginning of the inherently very short valve stroke, because of the very small seat angle difference. Furthermore, the valve needle meets the valve seat at the end of the closing movement in a hydraulically damped manner. Because the conical valve seat is only a few tenths of a millimeter wide, not only is an impermissable back pressure in the seat area avoided, but at the same time excessive hydraulic forces acting in the opening direction are prevented from building up, in accordance with the effective annular surface area, when the valve seat closes.

Despite restricted installation space, in a fuel injection pump in which, as is also known from U.S. Pat. No. 4,392,612 mentioned above, the electric adjusting member of the overflow valve is embodied as a reciprocating magnet which has a conductor coil received by a core and also has a plate-shaped armature secured to the valve member, and in which this armature forms a first axial air gap with an inner core section located inside the conductor coil and forms a second axial air gap with its rim and an outer core section encompassing the conductor coil, the radial forces engaging the valve member become negligibly small and the effective axial forces become extremely high, so as to promote a rapid switching movement of the overflow valve; as a result, the extremely short switching time needed for controlling fuel injection in Diesel engines is also attainable. The characteristics recited in this application relating to the electric adjusting member for the overflow valve used in accordance with the invention are already known per se, from German Offenlegungsschrift No. 31 39 669, for a similar and already previously described magnetic valve, although it functions differently. However, these characteristics are claimed in connection with the overflow valve embodied in accordance with the invention and functioning differently, so as thereby to fully exploit the advantages of the overflow valve embodied in accordance with the invention.

In a variant embodiment of the subject of the invention in which the valve member of the overflow valve is biased in the opening direction by a compression spring, as in the unit fuel injector of U.S. Pat. No. 4,392,612 mentioned above, if the needle tip is embodied as revealed herein the compression spring can be optimally designed in terms of the spring wire thickness and coil diameter, without considering other valve components. For instance, a hard spring with low initial force but a high final force and low mass can be accommodated in the smallest possible space, where it is readily accessible and adjustable, and where it reinforces the opening movement of the valve member in the desired manner.

In another feature of the invention, with a restriction in the form of an annular groove disposed on the valve member, the pressure chamber which can be subjected to injection pressure is adaptable for influencing the flow of the fuel, and the mass of the valve member that must be moved is reduced; this has a favorable effect on the short switching time that can be attained. By means of another feature of the invention, that is, the hollow-drilled guide shank of the valve member and the centrally acting stroke stop, the valve member masses that must be moved are reduced still more, which further contributes to attaining the extremely short switching time required. The stroke stop can also advantageously be optimized in terms of its effective diameter and the surfaces that meet one another, and a hydraulic impact damping is attainable by means of contact surfaces which are either plane parallel or ground to be slightly concave.

In accordance with the object of the invention, in order to assure the required chronologically accurate control of the supply onset in the fuel injection pump equipped with an electrically actuated overflow valve, even at very high injection pressures, a reservoir chamber defined by a deflecting piston is connected to the high-pressure chamber formed by the pump work chamber, pressure chamber, second section of the overflow conduit and pressure conduit as far as the injection nozzle. The displacement volume, as defined by the diameter and by the stroke of the deflecting piston taking place counter to the force of a compression spring, and the fuel pressure then effective in the reservoir chamber limit the fuel pressure that builds up in the high-pressure chamber during the closing process of the overflow valve. As a result, pressure peaks that hinder the closing of the overflow valve are avoided, and the required closing force of the overflow valve is limited, or the closing speed is increased.

In a fuel injection pump according to the invention, embodied as a unit fuel injector which also includes the injection nozzle, a simple conduit course is attained by means of further characteristics of the invention, especially if as further defined by the invention the low-pressure chamber is filled with fuel subjected to inflow pressure and if it simultaneously serves as the suction chamber of the fuel injection pump.

The instant when the deflecting piston comes into action and its mode of operation, as well as pressure conditions in the pump work chamber and the standing pressure in the pressure conduit leading to the injection nozzle can be adjusted to optimal values in a simple manner and substantially independently of one another if in accordance with a further feature of the invention the deflecting piston is formed by the cylindrical guide portion of a pressure valve embodied as a cylinder valve; on its end that plunges into the reservoir chamber, the deflecting piston has the valve closing surface which blocks the connection from the pump work chamber to the injection nozzle during intervals when fuel is not being supplied. In still another feature of the invention, a pressure step is formed on the valve closing member of the pressure valve, by means of which the pressure valve functions as an equal-pressure relief valve and effects a constant standing pressure in the pressure conduit leading to the injection nozzle. The difference defined by the invention between the conical angles of the conical valve closing surface and the valve seat results in a sharp-edged sealing edge having a good sealing effect and assures precise adherence to the previously calculated pressure step. If the valve closing member, on its end adjacent to the conical valve closing surface, is provided with a short throttle tang which plunges into the conduit connecting the pump work chamber and the reservoir chamber, then the opening characteristic of the pressure valve, and hence the course of the deflecting stroke of the deflecting piston over time, can be adapted to the required values.

Since the flow cross section and the associated valve stroke can be defined as small as possible at the electromagnetically actuated overflow valve, in order to limit the required magnetic adjusting force and to reduce the structural size of the entire assembly, it is of the greatest possible importance, for satisfactory functioning of the fuel injection apparatus and for attaining a rapid end of injection, that the opening movement of the valve needle be reinforced by additional hydraulic means. Thus in a fuel injection pump as embodied in accordance with this disclosure, in which the extension at the needle tip of the valve member is provided with a flow-directing external contour, an additional pulse reaction force, which is exerted in the opening direction, is generated by means of deflecting the outlowing fuel. Because of the approximately constant flow cross section throttling is avoided, and so the fuel can flow out very rapidly, in the desired manner, so as to end the injection. A still greater increase in the hydraulic forces acting upon the valve needle in the opening direction is attained by means of a short step disposed at the transition from the closing surface to the concave external contour. As a result, a back presssure that accelerates the opening movement of the valve member becomes effective only in the first portion of the valve stroke, so that subsequently, very rapidly, the entire opening stroke is executed and the flow cross section opened up.

If the valve member needle tip extension having the flow-directing external contour is embodied by a protrusion in the form of an annular bead plunging into the enlarged transitional zone between the valve seat and the return flow opening, then in addition to a pulse reaction force resulting from the deflection in the outflow direction, the pressure of the fuel is exploited once again to accelerate the opening movement, because the fuel stream is deflected once more time toward the valve member before it enters the flow opening.

If the valve member needle tip extension comprises a lenticular dome as defined by the invention, then the flow losses are low, which is desirable. If the transitional zone from the valve seat to the flow opening is also embodied as defined by the invention, such that in the open position of the valve member a progressively wider flow cross section toward the flow opening is brought about, then negative forces which otherwise arise at cutoff edges and which hinder the opening movement of the valve member are avoided.

The invention will be better understood and further objects and advantages thereof will become more apparent from the ensuing detailed description of preferred embodiments taken in conjunction with the drawings.

BRIEF DESCRIPTION OF THE DRAWINGS

FIG. 4 is an enlarged detailed cross section of FIG. 1 in the vicinity of the pressure valve for a preferred variant of the pressure valve used in the first exemplary embodiment.

DESCRIPTION OF THE PREFERRED EMBODIMENTS

Figure 1:
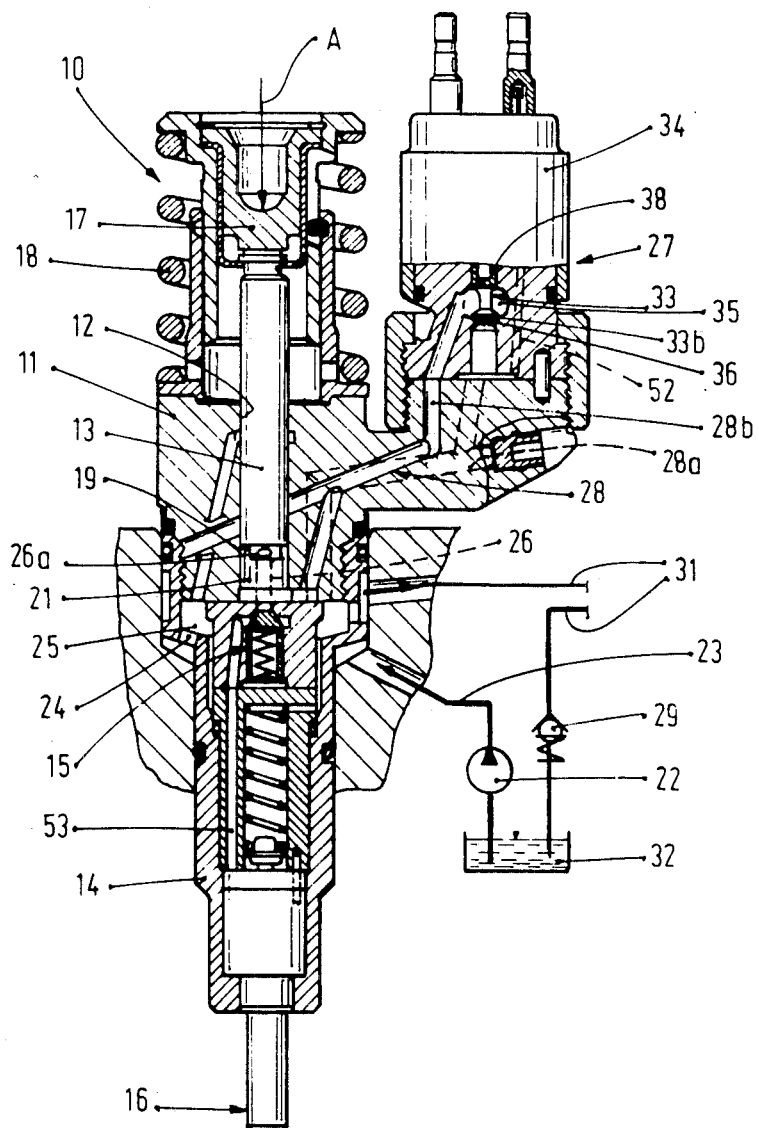
FIG. 1 is a longitudinal cross section taken through the first exemplary embodiment of the fuel injection pump according to the invention, embodied as a unit fuel injector.

The first exemplary embodiment of the electrically controlled fuel injection pump according to the invention, shown in FIG. 1, is a unit fuel injector 10 not otherwise shown but mechanically driven by a camshaft in a known manner. The pump housing 10 of this unit fuel injector receives a pump piston 13 driven at a constant stroke and guided in a pump cylinder, and on its end it bears an injection nozzle 16, of a known type and therefore not otherwise shown, which is secured by means of a screw sheath 14, with a pressure valve 15 located between. The pump piston 13 is driven by known drive means, which are therefore indicated only by an arrow A, via a pump tappet 17 counter to the restoring force of a tappet spring 18. With its end face 19, the pump piston defines a pump work chamber 21 located in the pump cylinder 12, which on the side toward the injection nozzle is closed off by the pressure valve 15 and can be made to communicate with the injection nozzle 16 via a pressure conduit 53. Further details of the embodiment and function of the pressure valve 15 are described below in conjunction with FIG. 4.

From the pump work chamber 21, in the outer dead center position of the pump piston 13 shown, fuel is pumped at low inflow pressure, for instance 4 bar, by a feed pump 22. This fuel proceeds from the feed pump 22 via a supply line 23 and at least one opening 24 in the wall of the screw sheath 14 into a low-pressure chamber surrounding the pressure valve 15 inside the screw sheath 14, and from there it proceeds via an inflow conduit 26 and its inflow opening 26a to the pump work chamber 21. In the open position, shown, of an overflow valve 27, the low-pressure chamber 25 and the pump work chamber 21 are also connected with one another by an overflow conduit 28, which is controlled by this overflow valve 27.

The inflow pressure of the fuel delivered to the low-pressure chamber 25 by the feed pump 22 via the supply line 23 is determined by a pressure limiting valve 29, which is inserted into a return line 1. This return line is shown in broken lines as part of a ring line leading to the other unit fuel injectors of the same internal combustion engine and finally carries the excess fuel back to a tank 32.

Figure 2:
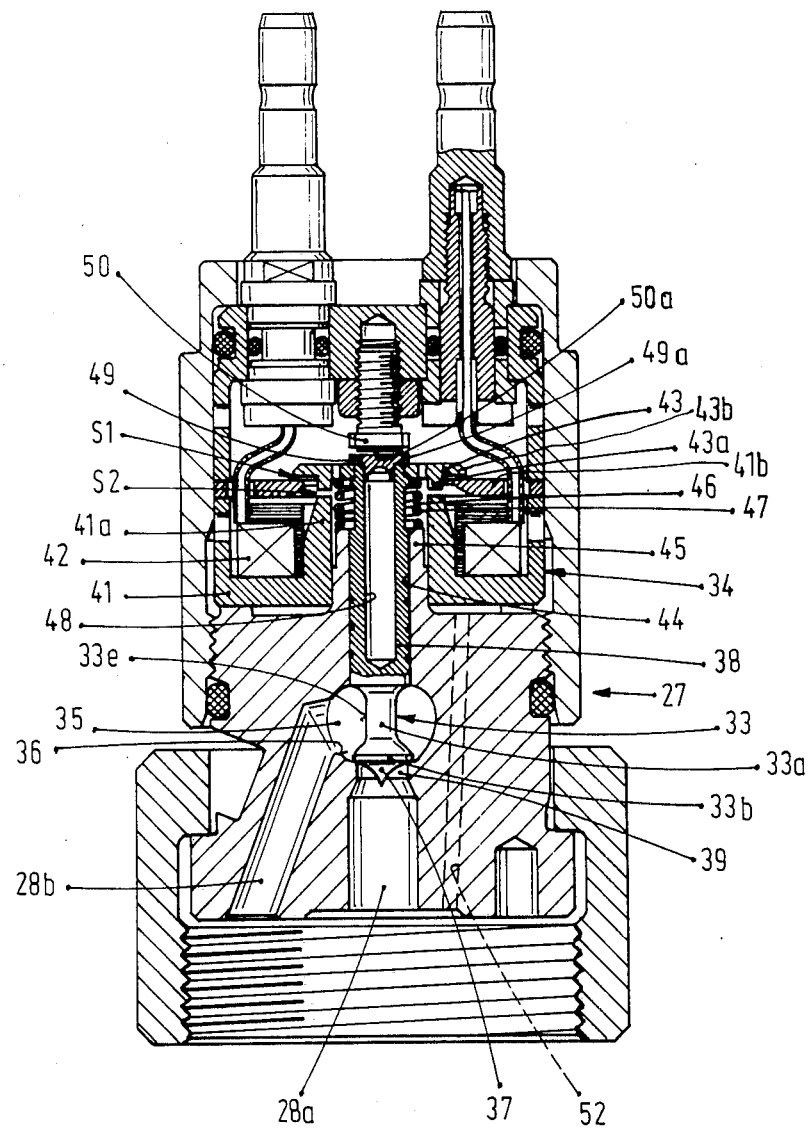
FIG. 2 is a longitudinal cross section taken through the overflow valve used in FIG. 1 and controlling the supply onset and the supply quantity, seen on a larger scale.

The overflow valve 27, functioning as a 2/2-way valve, is a magnetic valve, which in order to show its control function is shown only partially cutaway in FIG. 1. To show its individual components, however, this valve is shown on an enlarged scale in FIGS. 2 and 2a. The overflow valve 27 is embodied as a needle valve, the valve member 33 of which is actuated by means of an electric adjusting member 34, embodied by an electromagnet, and is surrounded in the vicinity of its end section 33a remote from the adjusting member 34 by a pressure chamber 35. This pressure chamber 36 can be connected on the one hand with the low-pressure chamber 25, via a first section 28a, shown in broken lines in FIG. 1, of the overflow conduit 38, while on the other hand it communicates permanently with the pump work chamber 21, via a second section 28b of the overflow conduit 28. At the transition from the pressure chamber 25 to the first section 28a of the overflow conduit 28, the open connection shown in FIG. 1 from the pressure chamber 35 to the low-pressure chamber 25 has a conical valve seat 36 which is closable by a conical closing surface 33b on the end section 33a of the valve member 33. The valve member 33, embodied as a valve needle which opens inward toward the pressure chamber 35 which can be subjected to injection pressure, has a needle tip 37, which is radially defined by the conical closing surface 33b, on its end section 33a toward the outflow side.

Adjacent to the closing surface 33b, the needle tip 37 has a rotationally symmetrical extension 37a, which is provided with a flow-directing external contour 37b, in the form of a concave cone jacket (see FIG. 2a), which reinforces the needle stroke movement in the opening direction. Further distinct forms of this flow-directing external contour and of the associated valve seat area are described below in conjunction with FIGS. 5a-5d, which show several other valve arrangements.

In direct fuel injection into Diesel engines, very high injection pressures, above 1000 bar, occur. To enable the overflow valve 27 to manage this high pressure without difficulty, the above-described electromagnetically actuated and inwardly opening needle valve is used in accordance with the invention to block the fuel flowing out of the pump work chamber 21. This valve operates satisfactorily only if it meets the following conditions (see FIG. 2a):

(a) the cone angle $\alpha$ of the conical closing surface 33b on the end section 33a of the valve member 33 is larger than the cone angle $\beta$ of the associated valve seat 36, which widens toward the pressure chamber 35, and in order to obtain a large flow cross section when the valve strokes are short, a very flat cone angle $\alpha$, for instance 140°, is selected;

(b) the closing surface 33b, together with an adjoining cylindrical jacket surface 33c on the end section 33a of the valve member 33, forms a sealing edge 33d, the diameter $d_D$ of which is equal to or only slightly smaller than the guide diameter $d_F$ of a guide shank 38 joining the end section 33a of the valve member 33 to the adjusting member 34; and (c) the conical valve seat 36 has an effective seat surface which is only a few tenths of a millimeter wide, is covered by the closing surface 33b at the needle tip 37 of the valve needle 33 in the closed state of the overflow valve 27, and is defined on the inside, toward the needle tip 37, by the diameter D of a flow opening 39.

By using this very narrow effective seat surface, the flow cross section is not restricted to an impermissibly great extent, and an unintended throttling of the outflow is avoided. The overflow valve 27 is completely balanced in pressure in the closed state, or virtually completely in the case where there are differences between the diameters $d_F$ and $d_D$.

Figure 2A:
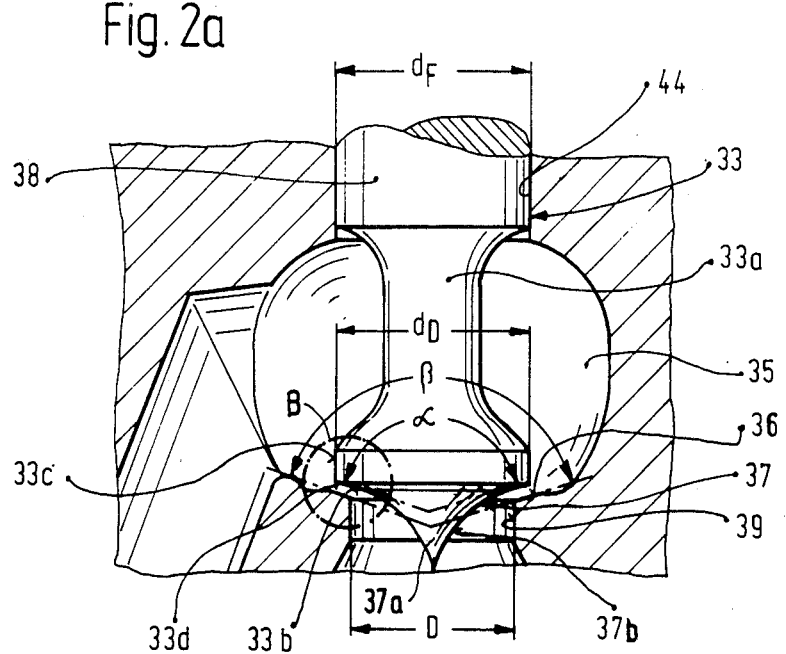
FIG. 2a is a detail of FIG. 2, showing the vicinity of the valve seat, on a larger scale.

A further provision for reinforcing the required rapid opening movement has proved advantageous, namely if the following conditions are met as well:

(d) the seat angle difference $\alpha - \beta$ mentioned in (a) is very small and is in the vicinity of 0.5°, so that the largest possible hydraulic force, acting in the opening direction as it flows through the valve, is already attained at the beginning of the stroke, and so that a hydraulic damping is attained when the valve member 33 assumes its valve seat 36 at the end of the closing movement; and (e) by means of the needle tip 37 described in greater detail in conjunction with FIG. 2a and having a flow-directing external contour 37b, additional forces acting in the opening direction are introduced into the valve member 33. Other opportunities for increasing this pulse reaction force are described below in conjunction with FIGS. 5a–5d.

The electric adjusting member 34 (see FIG. 2) embodied by a reciprocating magnet has a conductor coil 42 which is received by a core 41, and a plate-like armature 43 which is secured to the guide shank 38 of the valve member 33. The core 41 of the adjusting member 34, containing the conductor coil 42, surrounds a housing section 45 which contains a guide bore 44 for the guide shank 38 of the valve member 33 and together with an inner core section 41a located inside the conductor coil 42, which core section faces an axially protruding cylindrical strut 43a on the armature 43, forms a first axial air gap $S_1$. Together with a rim area 43b of the armature 43, an outer core section 41b, which surrounds the conductor coil 42 on the outside and also partially on the end, forms a second axial air gap $S_2$. The two axial air gaps $S_1$ and $S_2$ are spaced apart both radially and axially from one another; however, with an appropriately modified shape of the two core sections 41a and 41b the axial air gaps could also be located in the same plane.

A compression spring 47 acting as a valve opening spring is inserted into a hollow chamber 46 which is radially defined by the guide shank 38 of the valve member 33, by the cylindrical strut 43a of the armature 43 and by the inner core section 41a of the core 41, and axially defined by the armature 43. This compression spring 47 presses the valve member 33 into its open position shown in FIGS. 1 and 2a, when the conductor coil 42 has no electrical current passing through it.

In order to reduce the weight of the masses that are to be moved, the guide shank 38 of the valve member 33 is provided with a blind bore 48 extending from its end toward the adjusting member and forming a hollow chamber. This blind bore 48 is closed by a hardened plug 49 forming a stroke stop for the valve member 33. When the valve member 33 is in the open-position, the plug 49 rests on an adjustable counterpart stop 50. This counterpart stop 50 is embodied by a stop screw threaded into place in a positionally secure manner, the end face 50a of which, like the end face 49a of the hardened plug 49, is ground plane or concave or slightly hollow, so as again to attain a hydraulic stroke damping. Because of the centrally located stops, both the diameter and the shape of the faces that meet one another can be designed optimally for appropriate damping. In the event that the counterpart stop 50 is to be adjustable from outside, it can also be extended out to the outside and secured and sealed off there.

The installation spaces receiving the core 41 together with the conductor coil 42 and the armature 43 communicate via a relief bore 52 (see FIG. 2; also suggested in FIG. 1) with the low-pressure side of the valve, which is connected to the first section 28a of the overflow conduit 28, which section communicates with the low-pressure chamber 25.

A restriction 33e, in the form of an annular groove, adjacent to the end section 33a of the valve member 33 between its guide shank 38 and the needle tip 37 having the closing surface 33b increases the volume of the pressure chamber 35; it also has a flow-directing function and also reduces the mass of the valve member 33 that must be moved.

Figure 3:
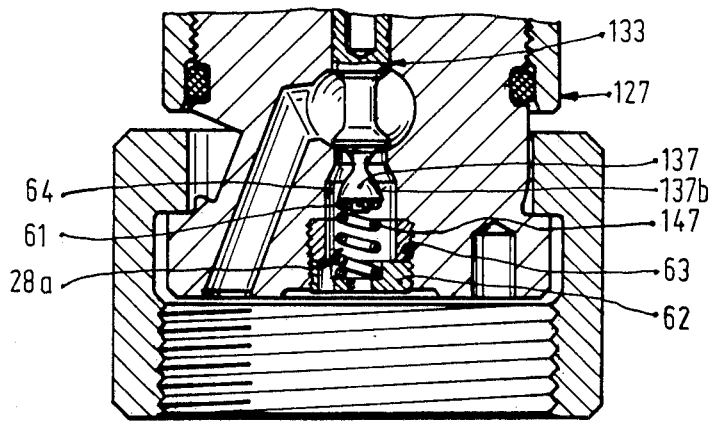
FIG. 3 is a partial longitudinal cross section, showing features that differ from FIG. 2, through the overflow valve used in the second exemplary embodiment.

The second exemplary embodiment, shown only in part in FIG. 3 in terms of a detail of the overflow valve, here indicated at 127, differs from the first exemplary embodiment only in the vicinity of the needle tip of the valve member (slightly modified elements having the same functions are therefore identified by a reference number increased by 100).

The valve member 133 of the overflow valve 127, which is shown in the closed state, is biased in the opening direction by a compression spring 147, which engages the end of needle tip 137 of the valve member 133. To this end, the needle tip 137 has a step 61 forming a first spring abutment for the compression spring 147. A second spring abutment 62 for the compression spring 147 is located in the first section 28a of the overflow conduit 28. The second spring abutment 62 comprises a flat annular screw with a juxtaposed spacer sleeve 63, which is furnished in various lengths for adjusting the spring biasing, and this assembly is secured in an enlarged section of a longitudinal bore 64. The longitudinal bore 64 is part of the first section 28a of the overflow conduit 28. Once again, the external contour 137b of the needle tip 137 has a flow-directing function.

The detail of FIG. 1 in the vicinity of the pressure valve 15 that is shown in FIG. 4 illustrates a preferred, practically embodied variant of this pressure valve in its open position, in which fuel subjected to injection pressure is positively displaced by the pump position 13 from the pump work chamber 21 via a conduit 71 and an opened valve seat 72 into the pressure line 53 leading to the injection nozzle 16.

The pressure valve 15 is embodied as a cylinder valve, the valve closing member 73 of which is guided with a cylindrical guide part in a guide bore 74 of a valve housing 75. The cylindrical guide part acts as a deflecting piston which plunges into an annular reservoir chamber 76 and defines this reservoir chamber 76 and is therefore designated as a deflecting piston 77. The deflecting piston 77 has a valve closing surface 78 on its end section that plunges into the reservoir chamber 76. The valve closing surface 78 is conical and is attached at the end to the deflecting piston 77 in an extension of a cylindrical tang 79, the diameter d of which is smaller than the outer diameter D of the deflecting piston 77. The conical valve closing surface 78, in the closing position of the valve closing member 73, closes the associated valve seat 72, which widens conically toward the reservoir chamber 76. To assure a pressure step which is always constant and to assure the pressures thereby being exerted, the cone angle $\delta$ of the conical valve closing surface 78 is slightly larger, that is, by approximately 0.5 to 1 degree, than the conical angle $\gamma$ of the valve seat 72.

To control the opening speed and the coincident pressure drop in the pump work chamber 21 and in the conduits connected thereto, in a further variant the valve closing member 73 has, on its end adjacent to the conical closing surface 78, a short throttle tang 81, indicated by dot-dash lines, which plunges into the conduit connecting the pump work chamber 21 to the reservoir chamber 76. In order that a sufficiently large flow cross section will be made available in the open position of the valve closing member 73, the length 1 of the throttle tang 81 is designed to be shorter than the valve stroke h of the valve closing member 73.

Deviating from known equal-pressure relief valves, the deflection stroke of the deflecting piston 77, which is defined by the valve stroke h, is of the greatest possible importance for the function of the fuel injection pump according to the invention, because the deflecting piston 77, in its stroke movement, removes a quantity of fuel determined by the valve stroke h and by its outside diameter $D_A$ from a high-pressure chamber 82 formed by the pump work chamber 21, the pressure chamber 35, the second section 28b of the overflow conduit 28 and the pressure conduit 53. Before each injection is initiated, the deflecting piston 77, under the influence of the force of a compression spring 84 received in a spring chamber 83, is located at a first stop, which in the example shown is formed by the valve seat 72, and its deflecting stroke corresponding to the valve stroke h is defined by a second stop 85 located in the spring chamber 83. Since the spring chamber 83 communicates via a continuously open conduit 86 with a relief chamber 87 that is separate from the pressure conduit 83 and is always under very low fuel pressure, the valve closing member 73 along with its deflecting piston 77 removes a corresponding displacement volume from the reservoir chamber 76 upon each valve stroke h or deflecting stroke.

Although the disposition of a deflecting piston according to the invention has particularly great advantages, even in fuel injection pumps of a different type, in connection with an inwardly opening valve needle acting as the overflow valve, a particularly favorable, space-saving and simple arrangement in terms of the conduit courses is attained in the unit fuel injector 10 shown as an exemplary embodiment here, because in this case a valve spring chamber which receives a valve closing spring 88 of the injection nozzle 16 serves as the relief chamber 87, which is in continuous communication with the low-pressure chamber 25 via a transverse bore 89 and a gap 91 between the valve housing 75 and the screw sheath 14 that secures the injection nozzle 16. As shown in FIG. 1, the low-pressure chamber 26 is filled with fuel that is at inflow pressure by the feed pump 22 and thus also serves as the suction chamber of the fuel injection pump. To control or damp the stroke movement of the deflecting piston 77, or of the valve closing member 73 bearing this deflecting piston 77, the continuously open conduit 86 and/or the transverse bore 89 can be embodied as throttle bores, the diameter of which is then defined by calculation or experimentation.

Although the deflecting piston 77 in the preferred variant is part of a pressure valve, it could also be connected to any other arbitrary location in the vicinity of the high-pressure chamber 82, with its reservoir chamber 76, in order to fulfill its function. As in the example shown, in this case as well at the onset of the closing movement of the valve member 33 of the overflow valve 27, embodied as a needle valve, it removes a displacement volume corresponding to its stroke at that time and thereby limits the fuel pressure, which rises in the high-pressure chamber 82 until the instant of closure of the valve member 33, to a value which permits a rapid closure of the overflow valve 27. This is of maximum importance in controlling a high-pressure injection and initiating the supply onset. This mode of operation of the deflecting piston 77 is also advantageous in fuel injection pumps in which the overflow valve is embodied as an outward-opening plate valve. There, again, the closing function of the valve member is improved by the limitation of the pressure rise in order to attain a more rapid blocking of the outflowing fuel and a limitation of the necessary closing force.

FIGS. 5a–5d, each of which shows an enlarged detail B of FIG. 2a, show variant forms of the extension 37a, which in FIG. 2a adjoins the closing surface 33b of the valve member 33. The outer contours of this extension 37a have a flow-directing function, and thus favorably affect the valve function so as to reinforce the opening movement. Since the variants shown in FIGS. 5a–5d differ from the first exemplary embodiment already shown on an enlarged scale in FIG. 2a only in the vicinity of the valve seat, the reference numerals used are increased by 200, 300, 400 or 500, respectively.

Figure 5A:
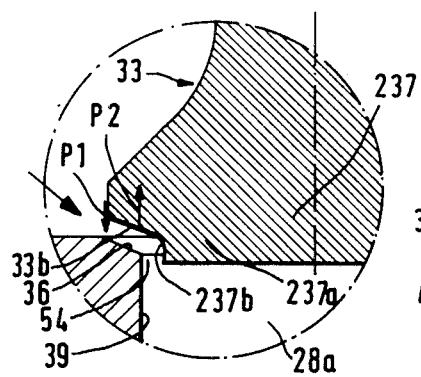
FIGS. 5a-5d each show an enlarged detail of the circled area of FIG. 2a having additional variant forms of the extension of the valve needle tip and the associated area of the valve seat.

In the variant shown in FIG. 5a, the extension 237a on the needle tip 237 of the valve member 33 is embodied by a short tang, the outer contour 237b of which, oriented toward the valve seat 36, is shaped concave adjacent to the closing surface 33b, so as to deflect the outflowing fuel. The distance from this outer contour 237b to the valve seat 36 and to the wall of the adjacent flow opening 39 is defined, in the transitional zone 54 from the valve seat 36 to the flow opening 39 and in the open position of the valve member 33, such that it assures an at least approximately constant flow cross section. A short arrow P1 and a longer arrow P2 pointing in the opening direction indicate that the axial components of the hydraulic forces acting upon the valve member 33 have a greater excess in the opening direction; that is, P2 is substantially greater than P1.

Figure 5C:
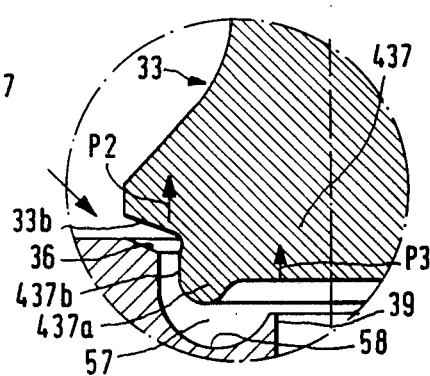
Figure 5B:
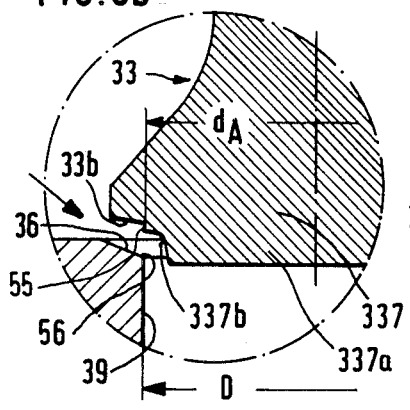

In the second variant form of a needle tip 337 of the valve member 33 shown in FIG. 5b, differing from the above-described variant shown in FIG. 5a, there is a short cylindrical step 55 at the transition from the closing surface 33b to a concave external contour 337b of an extension 337a. The outer diameter $d_A$ of this step 55 is approximately equal to the inside diameter D of the flow opening 39. In the closing position of the valve member 33, the step 55 extends as far as an edge 56 formed at the transition from the valve seat 36 to the flow opening 39. If need be, a slight overlap with this edge 56 may be advantageous, because at the beginning of the opening movement, the fuel pressure engagement of the closing surface 33b from below can be fully exploited for accelerating the opening movement of the valve member 33. By means of this edge 55, the full fuel pressure becomes effective at the closing surface 33b in the first portion of the opening stroke, and subsequently then the pulse reaction force generated by the deflection of the fuel stream at the outer contour 337b comes into play as well, so that in this variant shown in FIG. 5b the valve member 33 reaches its open position extremely fast.

The variant in the vicinity of the valve seat 36 shown on an enlarged scale in FIG. 5c has an extension 437a on the needle tip 437 of the valve member 33, which takes the form of an annular bead-like protrusion extending into an enlarged transitional zone 57 between the valve seat 36 and the flow opening 39. In order to deflect the outflow fuel, the external contour 437b of this extension 437a adjacent to the closing surface 33b is initially concave and then is convex on its end. This external contour 437b, in the illustrated open position of the valve member 33, is spaced apart from the wall of a concave end face annular groove 58, which partially surrounds the transitional zone 57 nearer the housing, by a distance such that here again, an approximately constant flow section is assured. By the twofold deflection of the outflowing fuel stream, a pulse reaction force acting upon the valve member 33 in the opening direction is initially generated in the concave zone adjacent to the closing surface 33b, as in the foregoing variant forms, and then, after the fuel is deflected once more, the stream pressure becomes effective at the end face of the valve member and generates an additional force P3.

Figure 5D:
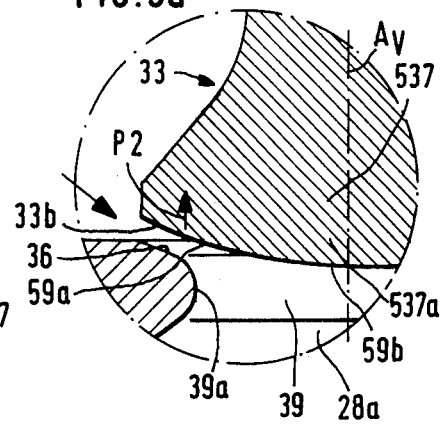

The fourth variant form, shown in FIG. 5d, differs from the foregoing variants particularly in that the external contour 537b on the needle tip 537 of the valve member 33 and the associated seat area are shaped such that as much as possible, no stream separation, with the resultant negative pressure, can take place. The needle tip 537 of the valve member 33 therefore has an extension 537a, which comprises a lenticular dome. The external contour 537b of this extension 537a has a first conical portion 59a adjoining the closing surface 33b at an at least approximately constant angle of inclination, which portion is adjoined toward the center axis $A_V$ of the needle tip 537 by a second, convexly curved or flattened portion 59b. Thus there are no separating edges on the needle tip 537, which would generate forces acting in the closing direction.

The advantages attainable with the above shaping of the external contour 537b can be reinforced still further if a wall 39a nearer the housing and located in the transitional zone 54 from the valve seat 36 to a flow opening 39 in the first section 28a of the overflow conduit 28 shown in FIG. 1 is convex in shape, as shown in FIG. 1. The result, in the illustrated open position of the valve member 33, is a flow cross section for the outflowing fuel which widens progressively toward the flow opening 39. In order to simplify manufacture, the convex wall 39a can also be composed of a plurality of hollow cone sections and a cylindrical bore (not shown). The force component P2 acting upon the valve member in this variant form is somewhat smaller than that in the variants of FIGS. 5a–5c. Because of the diffusor-like shape of the flow cross section, however, force components acting in the closing direction are predominantly precluded, so that the overall result is a desired accelerated opening movement of the valve member 33.

OPERATION

The mode of operation of the above-described fuel injection pump is as follows:

Once the pump piston 13, beginning at its outer dead center position shown in FIG. 1, begins its compression stroke, then the fuel delivered to the pump work chamber 21 by the feed pump 22 is forced back into the low-pressure chamber 25 in the first portion of the stroke both via the inflow conduit 26 and via the overflow conduit 28, which is open when the overflow valve 27 has no current running through it. After the closure of the inflow opening 26a of the inflow conduit 26, fuel continues to be positively displaced via the overflow conduit 28 until such time as the overflow valve 27, in order to initiate the effective supply onset, closes its valve seat 36 by means of the valve member 33. The fuel pressure which now builds up abruptly in the pump work chamber 21 opens the pressure valve 15, and the fuel is pumped to the injection nozzle 16 via the pressure conduit 53.

From there, after overcoming the valve opening pressure of the injection nozle 16, the fuel reaches the combustion chamber of the engine in a known manner.

Since the fuel pressure in the pump work chamber 21 is already rising during the closing movement of the valve member 33 of the overflow valve 27, the valve closing member 73 of the pressure valve 15, because of the appropriately designed biasing force of its compression spring 84, already begins its stroke movement. The guide part acting as the deflecting piston 77 removes a quantity of fuel, determined by the valve stroke traveled at that time and by the outer diameter $D_A$, from the high-pressure chamber 82. As a result of this provision, the overflow valve, which in the open state is not pressure-balanced, closes its valve seat 36 rapidly and reliably no matter what supply quantities and stroke speeds are involved.

To terminate the fuel supply, the supply of current to the adjusting member 34 of the overflow valve 27 is switched off in accordance with the operating data ascertained in an electronic regulating unit. The overflow valve 27 is switched over into its open position shown in FIGS. 1 and 2a by its compression spring 47 and above all by the pressure of the fuel located in the pressure chamber 34. As a result, the pressure in the pump work chamber 21 drops abruptly, and the injection nozzle 16 and the pressure valve 15 close, so that the injection is terminated.

For a rapid termination of the fuel supply, it has proved to be particularly important for the opening force of the compression spring 47 to be reinforced by the hydraulic pressure of the outflowing fuel. This is attained by means of the specialized embodiment of the flow-directing external contour 37b (see FIG. 2a) located on the needle tip 37. Further embodiments of this external contour (237b, 337b, 437b and 537b) are shown in FIGS. 5a–5d, and the advantages attainable have been described in detail in conjunction with the foregoing description of these drawing figures.

As a result of the selected design of the overflow valve 27, and especially as a result of the use of the deflecting piston 77 described along with its function in conjunction with FIG. 4, very short, exactly controllable injection times are attained even at very high injection pressures, which are exactly what are required for direct-injection engines. The preferred exemplary embodiment in FIG. 1 is a unit fuel injector, but naturally the characteristics of the invention can also be realized in single or in-line injection pumps in which one overflow valve 27 is associated with each pumping element. The same is true for distributor injection pumps, in which a single, central overflow valve of the proposed design then controls the fuel supply to the outlets or pressure lines controlled by the distributor.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An electrically controlled fuel injection pump for internal combustion engines, in particular a unit fuel injector for a Diesel engine, comprising a housing, at least one pump piston, a pump work chamber adjacent thereto, said pump piston having a supply stroke to pump fuel, which has been delivered at inflow pressure to said pump work chamber to an injection nozzle at injection pressure, an overflow valve provided with a valve member actuated by an electrical adjusting member, said valve member adapted to block the flow of fuel that otherwise overflows from said pump work chamber via an overflow conduit to a low-pressure chamber in proximity to said injection nozzle, said overflow valve further having a pressure chamber arranged to surround said valve member in the vicinity of an end section thereof remote from said electrical adjusting member, a guide shank on said valve member arranged to connect said remote end section of said valve member to said electrical adjusting member, said guide shank further being slidably supported in a guide bore, said remote end section having a conical valve seat, adapted to be closed by a conical surface having a cone angle ($\alpha$) on said remote end section at a point of transition which communicates with said low-pressure chamber of said overflow conduit, said overflow valve further being inserted between said first section and a second section which joins said pressure chamber permanently with said pump work chamber of said overflow conduit, said valve member of said overflow valve further including a valve needle arranged to open inwardly toward said pressure chamber, said valve needle having a conical closing surface that radially defines a needle tip, said needle tip further including said surface having said cone angle ($\alpha$) which is larger than a cone angle ($\beta$) of said conical valve seat that widens toward said pressure chamber, and further that said conical surface, together with an adjoining cylindrical jacket surface on said remote end section of said valve member is adapted to form a sealing edge, said sealing edge having a diameter ($d_D$) which is equal to or only slightly smaller than the guide diameter ($d_F$) of said guide shank.

2. A fuel injection pump as defined by claim 1, further wherein said needle tip of said valve member adjacent to said conical closing surface comprises a frustoconical jacket having an end portion including a rotationally symmetrical extension, said extension of said rotationally symmetrically end portion provided with a flow-directing external contour which effects a reinforcement of needle stroke movement in an opening direction.

3. A fuel injection pump as defined by claim 1, further wherein said two cone angles have a seat angle difference ($\alpha,\beta$) approximating 0.5°.

4. A fuel injection pump as defined by claim 1, further wherein said conical valve seat has an effective seat surface which is only a few tenths of a millimeter wide and in the closed state of said overflow valve said valve seat is covered by said closing surface of said needle tip, said seat surface being defined toward the needle tip by a diameter (D) of a flow opening in said first section of said overflow conduit.

5. A fuel injection pump as defined by claim 1, further wherein said electrical adjusting member of said overflow valve comprises a reciprocating magnet, said magnet having a conductor coil received by a core and platelike armature secured to said guide shank of said valve member, said armature adapted to form a first axial air gap ($S_1$) opposite an inner core section arranged to encompass said conductor coil said armature further including a rim area which forms a second axial air gap ($S_2$) opposite an outer core section encompassing said conductor coil, said core further arranged to surround a housing section provided with said guide bore for said guide shank of said valve member and further that said armature bears an axially protruding cylindrical strut which together with said inner core section forms said first axial air gap ($S_1$), said first axial air gap being spaced apart from said second air gap ($S_2$) by both a radial distance and an axial distance, the latter distance serving to avoid shear forces.

6. A fuel injection pump as defined by claim 2, further wherein said valve member of said overflow valve is biased in an open direction by a compression spring and further wherein said needle tip of said valve member has an end portion, a step on said end portion to form a first abutment for a compression spring, and further that a second spring abutment for said compression spring is inserted into said first section of said overflow conduit.

7. A fuel injection pump as defined by claim 1, further wherein said valve member is provided with a restriction between said guide shank and said needle tip said restriction comprising an annular groove which enlarges the volume of said compression chamber.

8. A fuel injection pump as defined by claim 1, further wherein said guide shank of said valve member is provided with a blind bore said blind bore being closed by a hardened plug which forms a stroke stop for said valve member, said plug further arranged to abut a juxtaposed stop when said valve member is in an open position.

9. A fuel injection pump as defined by claim 8, further wherein said hardened plug and said juxtaposed stop have mutually opposing end faces which are embodied as plane parallel or concave or slightly hollow-ground contacting surfaces.

10. A fuel injection pump as defined by claim 1, further wherein said pump work chamber communicates via a pressure conduit with said the injection nozzle, and further that a reservoir chamber defined by a deflecting piston is connected to a high-pressure chamber which can be placed under injection pressure by said pump piston and is formed by said pump work chamber, said compression chamber, said second section of said overflow conduit, and said pressure conduit up to said injection nozzle; whereby before initiation of each injection the deflecting piston, under the influence of the force of a compression spring which is positioned in a spring chamber in said deflecting piston rests on a first stop that determines its outset position, and further that said deflecting piston has a deflecting stroke which is defined by a second stop located in said spring chamber; and further that said spring chamber communicates with a relief chamber that is separate from said pressure conduit, or with said low-pressure chamber, via a conduit that is continuously open.

11. A fuel injection pump as defined by claim 10, further wherein said injection nozzle has a valve spring chamber arranged to receive a valve closing spring, said chamber adapted to be in continuous communication with said low-pressure chamber and to thereby serve as a relief chamber.

12. A fuel injection pump as defined by claim 11, further wherein said low-pressure chamber is filled by said feed pump with fuel subjected to inflow pressure and simultaneously serves as the suction chamber.

13. A fuel injection pump as defined by claim 10, further wherein fuel flow through said pressure conduit is controllable by means of a pressure valve, said valve closing member of said pressure valve arranged in intervals between fuel supply to block the connection from said pump work chamber to said injection nozzle and further that said pressure valve is a cylinder valve having a cylindrical guide part on said valve closing member, and further that the guide part also comprises said deflecting piston having a diameter (D) which has an end section that plunges into said reservoir chamber, said deflecting piston further including a valve closing surface adapted to control a valve seat and a mouth adjoining said pump work chamber and said reservoir chamber.

14. A fuel injection pump as defined by claim 13, further wherein said valve closing surface comprises a conical portion adjoined to said deflecting piston, said conical portion having a diameter (d) which is smaller than said diameter (D) of said deflecting piston, so that in the closing position of said valve closing member said conical closing surface is adapted to engage a complementally formed valve seat in said housing.

15. A fuel injection pump as defined by claim 14, further wherein said cone angle ($\delta$) of said conical valve closing surface is slightly larger than said cone angle ($\gamma$) of said valve seat in said housing.

16. A fuel injection pump as defined by claim 14, further wherein said valve closing member adjacent to said conical valve closing surface further includes on an end portion thereof a short throttle tang, said tang having a length smaller than a valve stroke (h) of said pressure valve.

17. A fuel injection pump as defined by claim 2, further wherein said extension on said needle tip of said valve member comprises a short tang, the external contour of which is concave in shape adjacent to said closing surface whereby in a transitional zone from said valve seat to a flow opening in said first section of said overflow conduit, in an open position of said valve member, said tang is spaced apart from said valve seat and said flow opening by a distance which assures an at least approximately constant flow cross section.

18. A fuel injection pump as defined by claim 17, further wherein said transition zone adjacent to said closing surface and to said external contour there is a short cylindrical step, said short cylindrical step having an outer diameter ($D_A$) which is approximately equal to said inner diameter (D) of said flow opening, and further that said short cylindrical step extends as far as a point of transition from said valve seat to said flow opening.

19. A fuel injection pump as defined by claim 2, further wherein said extension on said needle tip of said valve member comprises an annular bead-like protrusion which extends into an enlarged transitional zone provided between said valve seat and a flow opening in said first section of said overflow valve, and further that an external contour on said annular bead-like protrusion is concave adjacent to said closing surface and further that in an open position of said valve member said valve member is spaced apart from a concave end-face annular groove which partially surrounds said transitional zone by a distance that assures an approximately constant flow cross section.

20. A fuel injection pump as defined by claim 2, further wherein said extension on said needle tip of said valve member comprises a lenticular dome, and said lenticular dome is provided with an external contour which has a first conical portion adjoining said closing surface at an at least approximately constant angle of inclination, said first conical portion being adjoined toward a center axis ($A_V$) of said needle tip by a second, convexly curved or flattened portion.

21. A fuel injection pump as defined by claim 20, further wherein said housing includes a convex wall which extends from said valve set to a flow opening in said first section of said overflow conduit, thereby to attain a flow cross section that widens progressively toward said flow opening in an open position of said valve member.

* * * * *